(12) United States Patent
Takahashi et al.

(10) Patent No.: US 9,987,975 B2
(45) Date of Patent: Jun. 5, 2018

(54) VEHICLE LAMP WITH INTEGRALLY FORMED HOUSING, FIRST LIGHT GUIDING LENS, AND SECOND LIGHT GUIDING LENS

(71) Applicant: KOITO MANUFACTURING CO., LTD., Tokyo (JP)

(72) Inventors: Haruhito Takahashi, Shizuoka (JP); Shigehiko Kazaoka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 36 days.

(21) Appl. No.: 15/037,695

(22) PCT Filed: Nov. 6, 2014

(86) PCT No.: PCT/JP2014/079438
§ 371 (c)(1),
(2) Date: May 19, 2016

(87) PCT Pub. No.: WO2015/076114
PCT Pub. Date: May 28, 2015

(65) Prior Publication Data
US 2016/0297355 A1 Oct. 13, 2016

(30) Foreign Application Priority Data
Nov. 19, 2013 (JP) .................. 2013-238806

(51) Int. Cl.
*B60Q 1/26* (2006.01)
*F21S 43/241* (2018.01)
(Continued)

(52) U.S. Cl.
CPC ............ *B60Q 1/2669* (2013.01); *F21S 43/14* (2018.01); *F21S 43/19* (2018.01); *F21S 43/237* (2018.01);
(Continued)

(58) Field of Classification Search
CPC ............................. F21S 48/225; B60Q 1/2669
(Continued)

(56) References Cited

U.S. PATENT DOCUMENTS

2008/0290668 A1   11/2008   Ieda et al.
2011/0170305 A1   7/2011    Tanaka et al.
(Continued)

FOREIGN PATENT DOCUMENTS

JP   2002329403 A   11/2002
JP   2006009279 A   1/2006
(Continued)

OTHER PUBLICATIONS

International Search Report issued in corresponding application No. PCT/JP2014/079438 dated Feb. 17, 2015 (4 pages).
(Continued)

*Primary Examiner* — Toan Ly
(74) *Attorney, Agent, or Firm* — Osha Liang LLP

(57) ABSTRACT

A vehicle lamp has a circuit board on which a light emitting element is mounted, a housing for holding the circuit board, a first light guiding lens for guiding part of light emitted from the light emitting element in a predetermined direction, and a second light guiding lens for guiding at least the other part of the light emitted from the light emitting element in the other predetermined direction. The housing, the first light guiding lens and the second light guiding lens are formed integrally.

19 Claims, 9 Drawing Sheets

(51) Int. Cl.
  *F21V 5/04* (2006.01)
  *F21V 19/02* (2006.01)
  *F21V 23/02* (2006.01)

(52) U.S. Cl.
  CPC ........... *F21S 43/241* (2018.01); *F21S 43/245* (2018.01); *F21S 43/247* (2018.01); *F21S 43/26* (2018.01); *F21S 43/27* (2018.01); *F21S 43/315* (2018.01); *F21S 45/37* (2018.01); *F21S 45/50* (2018.01); *F21V 5/04* (2013.01); *F21V 19/02* (2013.01); *F21V 23/02* (2013.01); *B60Q 2400/40* (2013.01)

(58) Field of Classification Search
  USPC .......................................................... 362/522
  See application file for complete search history.

(56) References Cited

U.S. PATENT DOCUMENTS

| | | | |
|---|---|---|---|
| 2012/0261560 A1 | 10/2012 | Nomoto et al. | |
| 2014/0119043 A1* | 5/2014 | Kodama | B60Q 3/225 362/551 |
| 2014/0340893 A1* | 11/2014 | Hsu | F21K 9/61 362/235 |

FOREIGN PATENT DOCUMENTS

| | | |
|---|---|---|
| JP | 2009133133 A | 6/2009 |
| JP | 2009245601 A | 10/2009 |
| JP | 2010229797 A | 10/2010 |
| JP | 2012220821 A | 11/2012 |
| JP | 2013014211 A | 1/2013 |
| JP | 2013037926 A | 2/2013 |

OTHER PUBLICATIONS

Written Opinion of the International Searching Authority issued in corresponding application No. PCT/JP2014/079438 dated Feb. 17, 2015 (5 pages).

\* cited by examiner

VEHICLE LAMP WITH INTEGRALLY FORMED HOUSING, FIRST LIGHT GUIDING LENS, AND SECOND LIGHT GUIDING LENS

CROSS-REFERENCE TO RELATED APPLICATIONS

The present application is a national stage application of PCT/JP2014/079438 filed Nov. 6, 2014, and claims priority to Japanese Patent Application No. 2013-238806 filed on Nov. 19, 2013, the content of which are incorporated herein by reference in their entirety.

BACKGROUND

Technical Field

The present invention relates to a technical field of a vehicle lamp including a housing for holding a circuit board on which a light emitting element is mounted.

Related Art

PRIOR ART LITERATURE

Patent Literature

Patent Literature 1: JP-A-2010-229797
Patent Literature 2: JP-A-2009-133133
Patent Literature 3: JP-A-2006-9279

Some vehicle lamps have a configuration in which a circuit board is held in a housing, and a light emitting element which functions as a light source, for example, is mounted on the circuit board, so that light emitted from the light emitting element is shone in a predetermined direction.

As a vehicle lamp like those described above, there is a vehicle lamp in which light is shone from a light emitting element incorporated in a door handle in a predetermined direction (refer, for example, to Patent Literatures 1 to 3).

Patent Literatures 1 and 2 disclose a technique to illuminate an area lying close to the feet of an occupant of a vehicle using an illumination unit incorporated in a door handle when a door of the vehicle is opened. The occupant then can see the area lying close to his or her feet to know, for example, the presence of a puddle as a result of the area in question being illuminated by the illumination unit when the door is opened, thereby making it possible to enhance the conveniences of the occupant.

Patent Literature 3 also discloses a technique in relation to an illumination unit incorporated in a door handle. In the illumination unit described in Patent Literature 3, an interior space is defined by a housing (a case) and a lid portion, and a circuit board is disposed in the interior space, a light emitting element being mounted on either side of the circuit board. Light emitted from one light emitting element is shone to an exterior portion via a diffusing portion which is provided in the housing, and light emitted from the other light emitting element is shone to the exterior portion via a diffusing portion which is provided on the lid portion. Thus, respective light rays emitted from the light emitting elements are shone in different directions.

SUMMARY OF THE INVENTION

In the vehicle lamp described in Patent Literature 3, however, the light rays emitted from the two light emitting elements are shone in the different directions, and therefore, the fabrication costs are increased to such an extent that the plurality of light emitting elements are provided.

On the other hand, in order to realize the enhancement in functionality described above, it may be desirable that an increase in the number of constituent components is prevented without calling for an increase in fabrication costs.

One or more embodiments of the invention provides a vehicle lamp which can ensure a high functionality in relation to shining light without calling for an increase in fabrication costs.

According to one or more embodiments of the invention, a vehicle lamp comprises a circuit board on which a light emitting element is mounted, a housing for holding the circuit board, a first light guiding lens for guiding part of light emitted from the light emitting element in a predetermined direction, and a second light guiding lens for guiding at least the other part of the light emitted from the light emitting element in the other predetermined direction. The housing, the first light guiding lens and the second light guiding lens are formed integrally.

By adopting this configuration, the light emitted from the light emitting element may be directed in the predetermined direction by the first light guiding lens and the second light guiding lens which are formed integrally with the housing.

According to one or more embodiments of the invention, the first light entering surface which part of light emitted from the light emitting element enters is formed on the first light guiding lens, a second light entering surface which at least the other part of the light emitted from the light emitting element enters and a reflecting surface which reflects light which enters from the second light entering surface are formed on the second light guiding lens, and the light which enters from the first light entering surface and the light which enters from the second light entering surface are emitted in different directions.

By adopting this configuration, the light emitted from the single light emitting element may be shone in the different directions.

According to one or more embodiments of the invention, a functional surface is formed on the second light guiding lens, and part of light which enters from the second light entering surface is reflected at the reflecting surface and light which enters from the second light entering surface is emitted from the functional surface or is reflected on the functional surface depending on a light guiding path in the second light guiding lens.

By adopting this configuration, the light may be shone outwards in the different directions depending on the light guiding paths in the interior of the second light guiding lens.

According to one or more embodiments of the invention, the first light entering surface intersects an axis of light emitted from the light emitting element at right angles, and the second light entering surface is inclined relative to the axis of the light emitted from the light emitting element and is formed so as to project towards the light emitting element.

By adopting this configuration, the light which enters from the second light entering surface may be refracted in a direction in which the light is collected.

According to one or more embodiments of the invention, a functional surface from which part of light emitted from the light emitting element is emitted is formed on the second light guiding lens, and the first light exiting surface and the functional surface are positioned on opposite sides with a plane held therebetween which includes a light emitting surface of the light emitting element and intersects an optical axis of the light emitting element at right angles.

By adopting this configuration, the first light exiting surface and the functional surface which each emit light may be positioned on the opposite sides of the plane which includes the light emitting element.

According to one or more embodiments of the invention, a first light entering surface which part of light emitted from the light emitting element enters and a first light exiting surface which emits light which enters from the first light entering surface are formed on the first light guiding lens, and the first guiding lens has a shape in which an external shape becomes larger as the first guiding lens extends from the first light entering surface towards the first light exiting surface.

By adopting this configuration, light which is internally reflected on the circumferential surface of the first light guiding lens may be restricted from being diffused.

According to one or more embodiments of the invention, the first light exiting surface is inclined relative to a plane which intersects an axis of light emitted from the light emitting element.

By adopting this configuration, the light emitted from the first light exiting surface may be refracted in the direction according to the inclined angle of the first light exiting surface.

According to one or more embodiments of the invention, the light emitted from the light emitting element is guided in the predetermined direction by the first light guiding lens and the second light guiding lens which are formed integrally with the housing, thereby making it possible to ensure the high functionality in relation to shining light without calling for an increase in fabrication costs.

DETAILED DESCRIPTION

Figure 1:
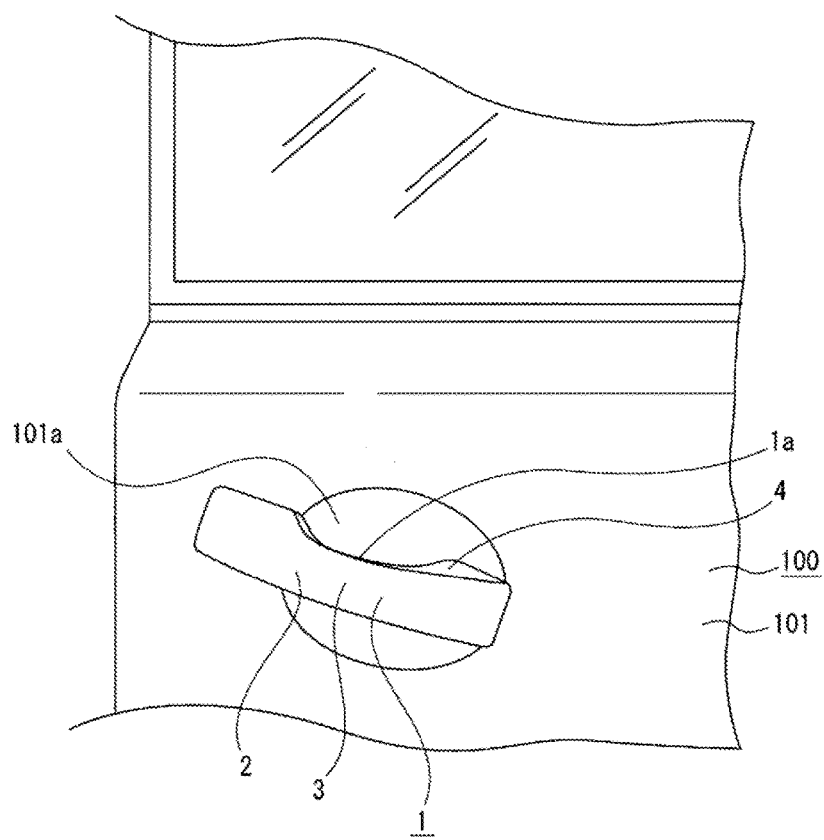
FIG. 1 shows a schematic perspective view showing a state in which a vehicle lamp is connected to a door according to one or more embodiments one or more embodiments of the present invention.

Hereinafter, embodiments of the invention will be described by reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A vehicle lamp 1 is, for example, a door handle having a shape which extends in a substantially front-to-rear direction and includes a housing 2 and a lamp unit, which will be described later, disposed in an interior of the housing 2 (refer to FIGS. 1 to 3). The vehicle lamp 1 is also used as a hand grip of a door 100 of a vehicle, and a connecting portion, not shown, is provided at a front end portion of the vehicle lamp 1, the front end portion being connected to a door panel 101 (refer to FIG. 1). An inserting recess portion 101a is formed on an outer surface of the door panel 101 so that an operator (an occupant) inserts his or her fingers inside the vehicle lamp 1.

The vehicle lamp 1 can rotate relative to the door 100 about the front end portion as a fulcrum in such a way that at a rear end portion moves in a left-to-right direction of the vehicle. When the door 100 is opened, the vehicle lamp 1 is rotated by the operator in a direction in which the rear end portion moves away from the door panel 101. When the operator ends the opening operation, the vehicle lamp 1 is rotated by a biasing device, not shown, in a direction in which the rear end portion moves towards the door panel 101, returning to its original position before the opening operation is performed.

In the vehicle including the vehicle lamp 1 described above, when the operator holding a key to start an engine of the vehicle with reaches a certain distance away from the vehicle lamp 1, the existence of the key is detected by a detecting portion, now shown, incorporated in the vehicle lamp 1. As the existence of the key is detected in the way described above, light is shone from a lamp unit, which will be described later, disposed in an interior of the vehicle lamp 1. Light is shone at least downwards of the vehicle lamp 1 from the lamp unit, and an area lying close to the feet of the operation is illuminated by the light so shone. This allows the occupant to see the illuminated area lying close to his or her feet to realize the existence of a puddle, if any, when the occupant opens the door 100 at night. Thus, the vehicle lamp 1 can enhance the conveniences of the occupant.

Figure 2:
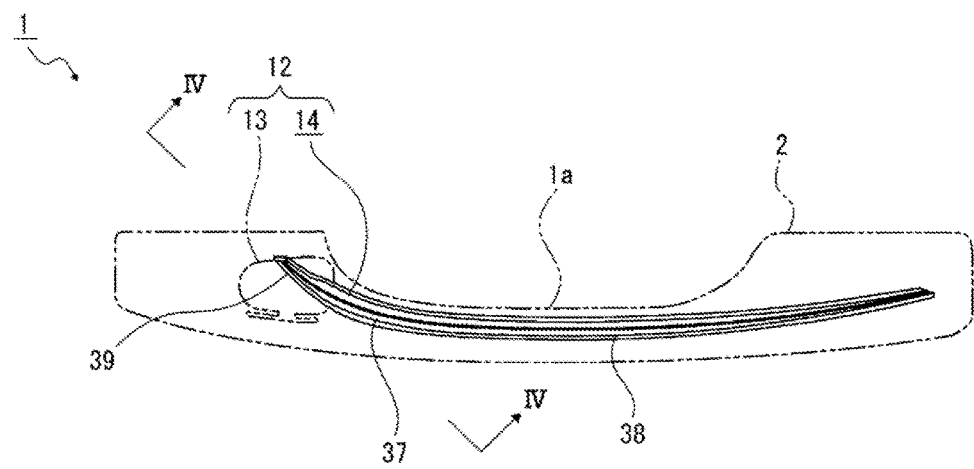
FIG. 2 is a schematic plan view of the vehicle lamp.

A gripping recess portion 1a is formed on the vehicle lamp 1 over a portion excluding the front and rear end portions so as to be concave inwards, that is, so as to be opened towards the door panel 101 (refer to FIGS. 1 and 2). The operator (the occupant) inserts his or her fingers into the gripping recess portion 1a to grip and operate the vehicle lamp 1.

Figure 4:
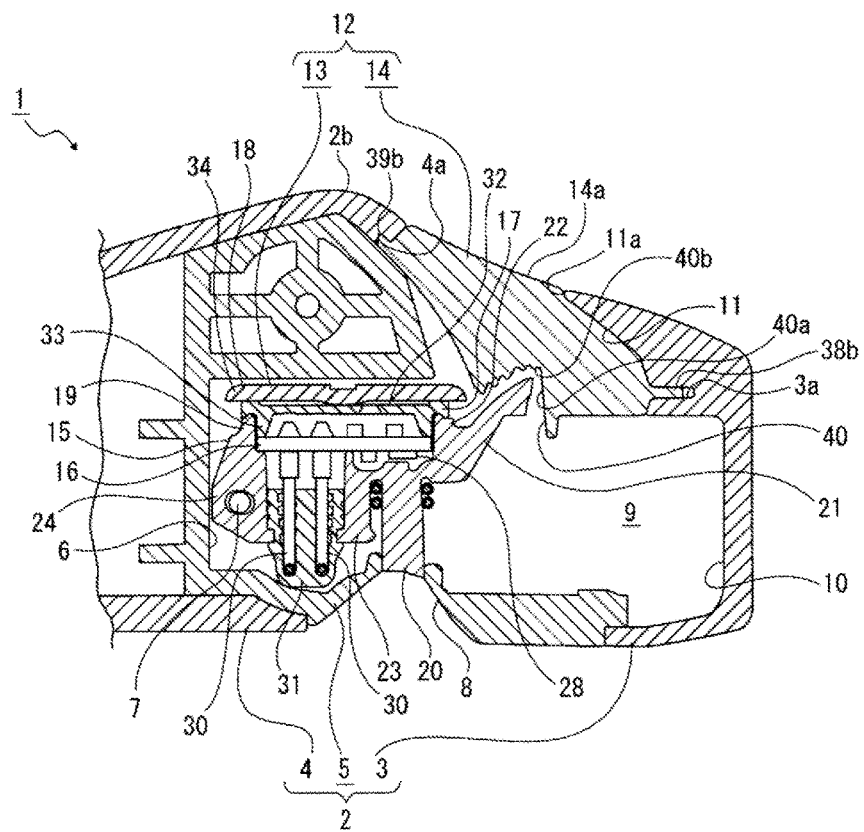
FIG. 4 is an enlarged sectional view taken along a line IV-IV in FIG. 2.

The casing 2 has a first panel 3, a second panel 4 and an inner panel 5 (refer to FIG. 4). The first panel 3 and the second panel 4 are connected together in a left-to-right direction except for portions thereof, and the first panel 3 is positioned outside and the second panel 4 is positioned inside, that is, a side facing the door panel 101.

The inner panel 5 is positioned between the first panel 3 and the second panel 4 with the first panel 3 and the second panel 4 connected together and is disposed on at least a rear end side between the first panel 3 and the second panel 4. A disposing recess portion 6 is formed on the inner panel 5, and the disposing recess portion 6 is opened substantially to the front. A positioning pin 7, which extends substantially in the left-to-right direction, is provided in a position lying closer to a lower end of the inner panel 5.

An annular restricting wall portion 8 is provided at a lower end portion of the housing 2 so as to penetrate theretrough in an up-to-down direction, and a space inside the restricting wall portion 8 communicates with a disposing space 9 and a space below the vehicle lamp 1 (refer to FIGS. 4 and 6). The restricting wall portion 8 is configured by a lower end portion of the second panel 4 and a lower end portion of the inner panel 5 being continuously connected together in a circumferential direction.

The disposing space 9 is formed between the first panel 3 and the second panel 4 in an interior of the housing 2 and is formed as a space which extends in the front-to-rear direction. The disposing space 9 has a first space 10 and a second space 11. The first space 10 is positioned below the second space 11. The second space 11 is opened upwards, and an upper opening portion 11a is formed into a slit which extends substantially in the front-to-rear direction.

Figure 6:
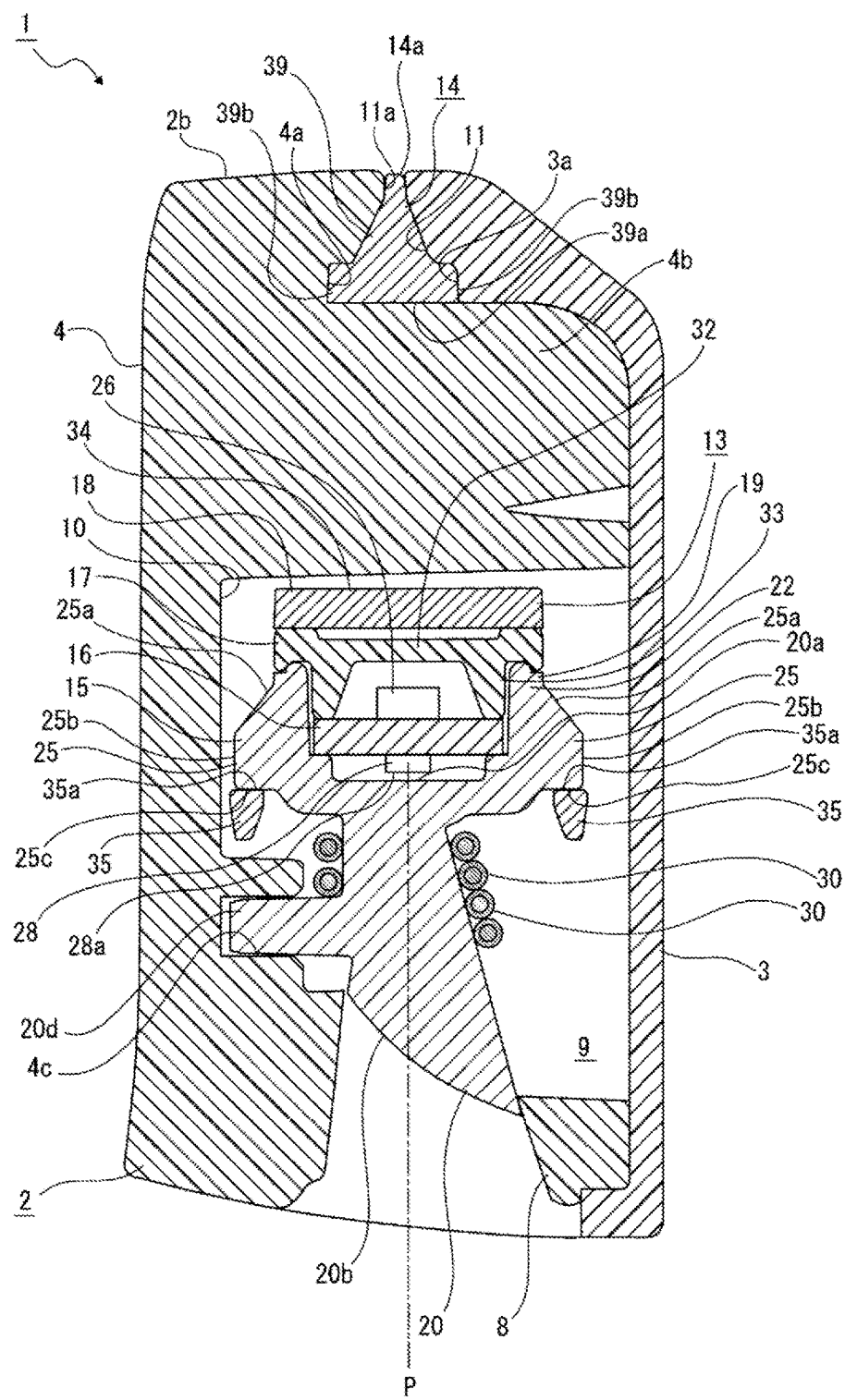
FIG. 6 is an enlarged sectional view taken along a line VI-VI in FIG. 3.
Figure 8:
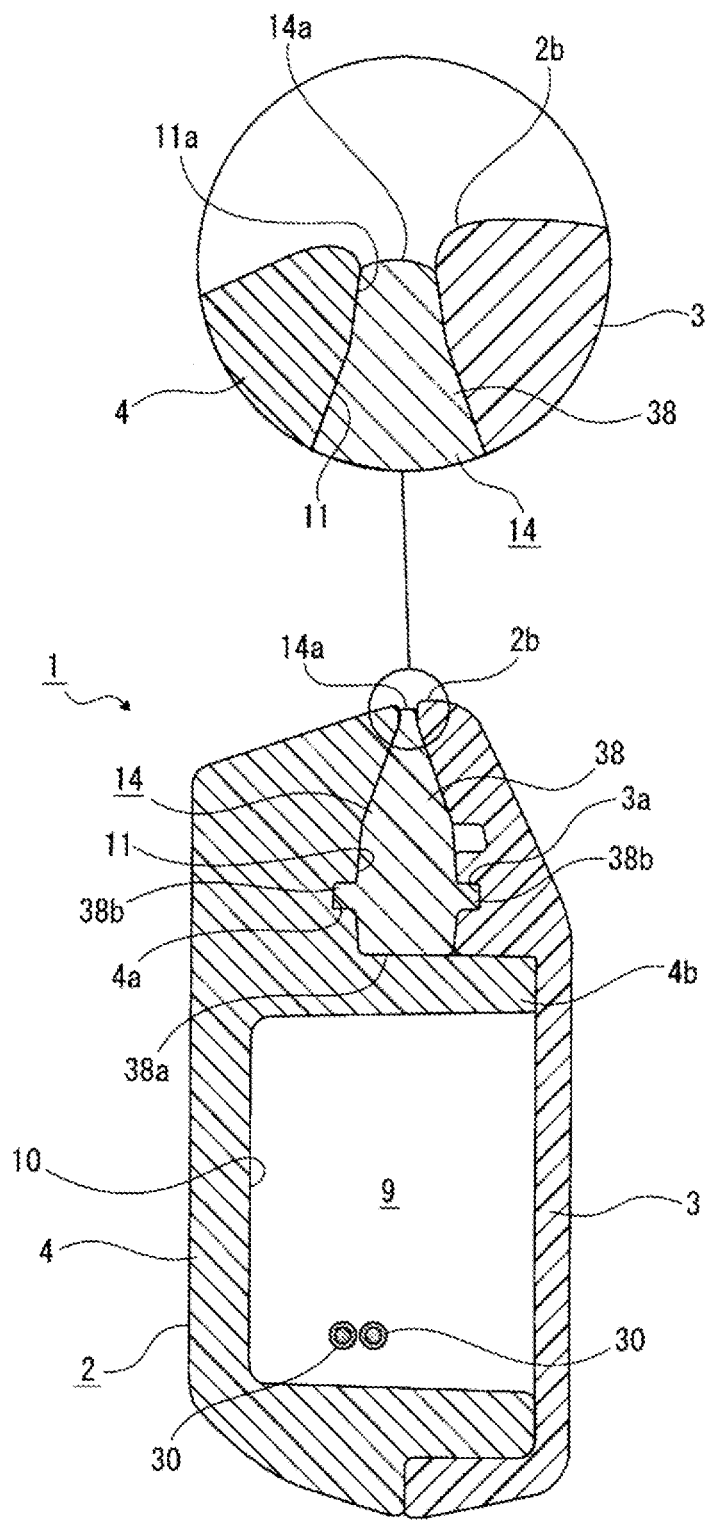
FIG. 8 is an enlarged sectional view taken along a line VIII-VIII in FIG. 3.

An aligning recess portion 3a is formed on an inner surface of a portion of the first panel 3 which excludes a rear end side portion thereof so as to be opened at least towards the second panel 4, and this aligning recess portion 3a extends substantially in the front-to-rear direction (refer to FIGS. 4, 6 and 8).

An aligning recess portion 4a is formed on an inner surface of a portion of the second panel 4 which excludes a rear end side portion thereof so as to be opened at least towards the first panel 3, and this aligning recess portion 4a is formed in a position which lies opposite to the aligning recess portion 3a formed on the first panel 3 so as to extend substantially in the front-to-rear direction.

A partitioning projecting portion 4b is provided on the second panel 4 so as to project from a middle portion in the up-to-down direction towards the first panel 3. The disposing space 9 is partitioned into a first space 10 and a second space 11 by the partitioning projecting portion 4b except for a portion thereof.

A positioning recess portion 4c is formed on the second panel 4 in a position lying closer to a lower end thereof so as to be opened towards the first panel 3 (refer to FIG. 6).

A lamp unit 12 is disposed in the disposing space 9 which is defined in the interior of the housing 2 (refer to FIGS. 2, 3, 4 and 6). The lamp unit 12 is made up of an illumination member 13 and a light guiding member 14.

Figure 5:
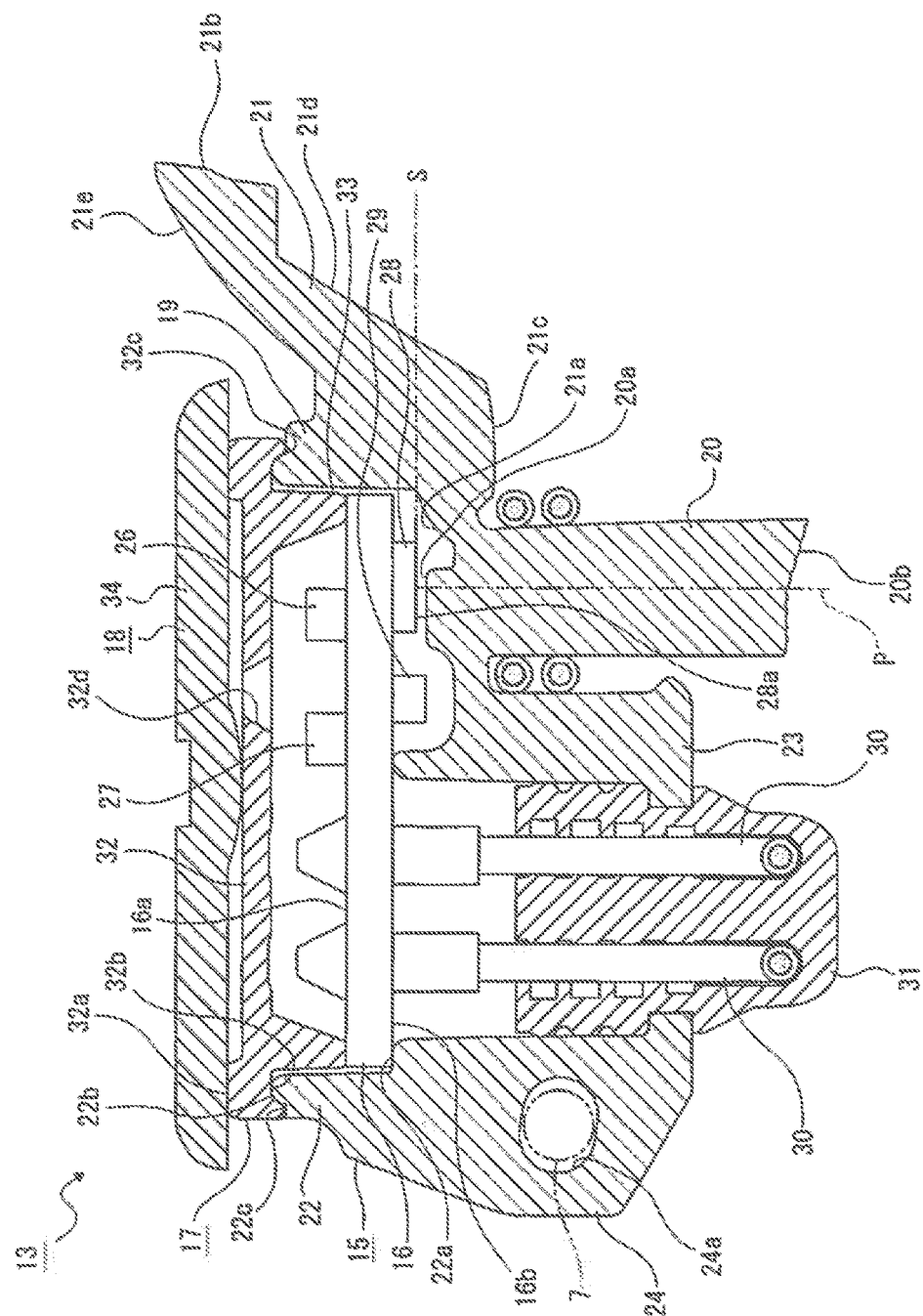
FIG. 5 is an enlarged sectional view of an illumination member.
Figure 9:
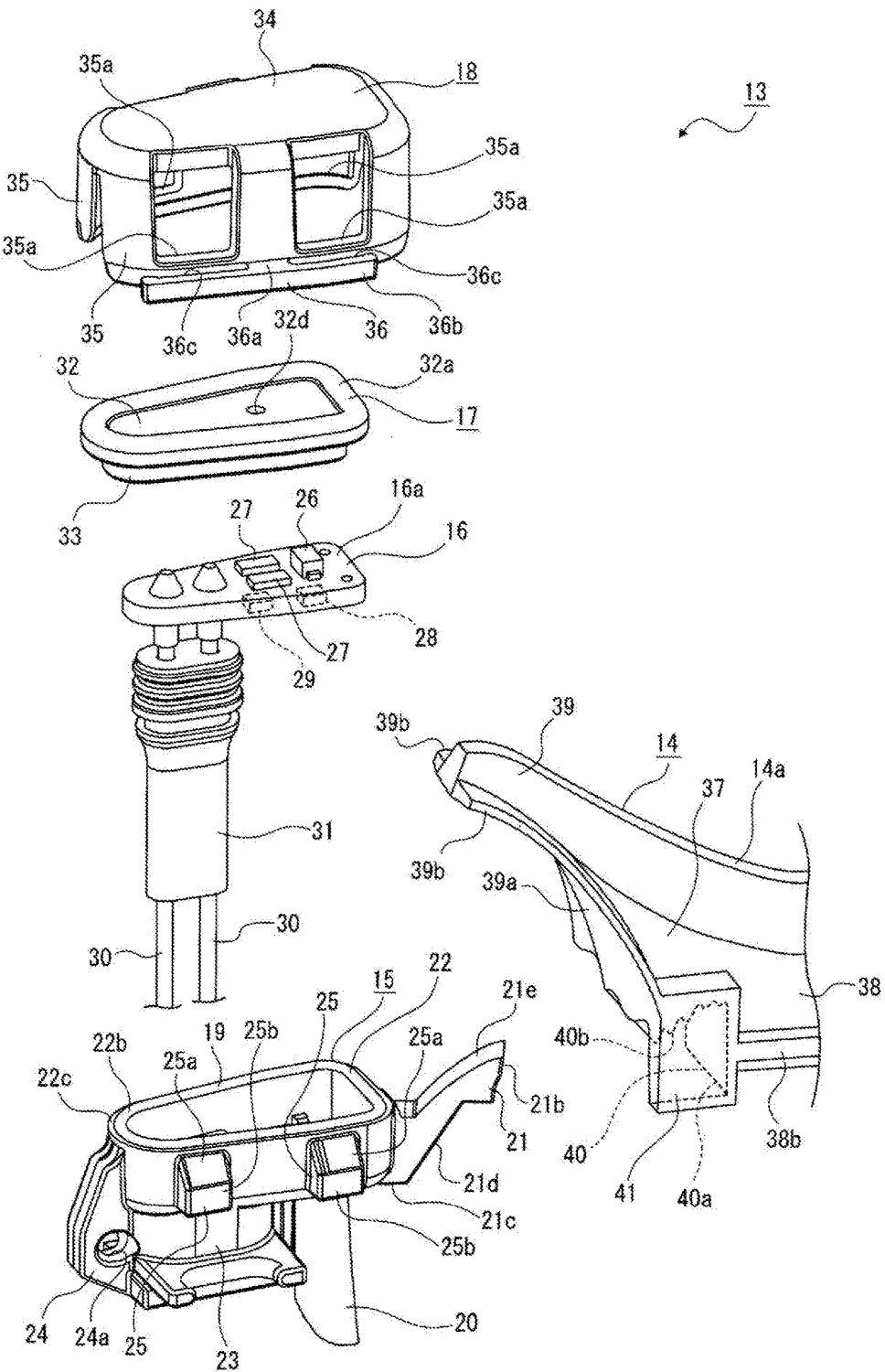
FIG. 9 is an enlarged exploded perspective view of the illumination member.

The illumination member 13 has a composite structure 15 which is formed of a transparent material, a circuit board 16 which is held to the composite structure 15, a gasket 17 which is mounted on the composite structure 15 and a lid member 18 which is connected to the composite structure 15 (refer to FIGS. 4, 5 and 9).

The composite structure 15 is made up of a housing 19, a first light guiding lens 20 and a second light guiding lens 21 which are formed integrally. The composite structure 15 is disposed in the first space 10 of the disposing space 9 in such a state that the housing 19 is mounted on the housing 2 and at least a portion of the composite structure 15 is inserted into the disposing recess portion 6 on the inner panel 5.

The housing 19 has a circuit board disposing portion 22 which is formed into a box shape which is opened upwards, a cord inserting portion 23 which projects downwards from the circuit board disposing portion 22, a positioning projecting portion 24 which projects rearwards from the circuit board disposing portion 22 and the cord inserting portion 23 and connecting projecting portions 25, 25, . . . which are provided on left and right side surfaces of the circuit board disposing portion 22.

The circuit board disposing portion 22 has an internal shape which is the same as an external shape of the circuit board 16 and a size which is slightly larger than a size of the circuit board 16. Upwardly oriented circuit board bearing surfaces 22a, 22a, . . . are formed at a lower end portion of an inner circumferential edge of the circuit board disposing portion 22 so as to be spaced apart in a circumferential direction. An upper end portion of the circuit board disposing portion 22 is provided as a fitting projecting portion 22b which projects upwards except for an outer circumferential portion thereof, and an outer circumferential portion of the fitting projecting portion 22b is formed as an engaging recess portion 22c which is opened upwards and outwards.

The cord inserting portion 23 is formed into a cylindrical shape which penetrates vertically.

A positioning hole 24a is formed in the positioning projecting portion 24 so as to penetrate therethrough horizontally laterally.

Figure 7:
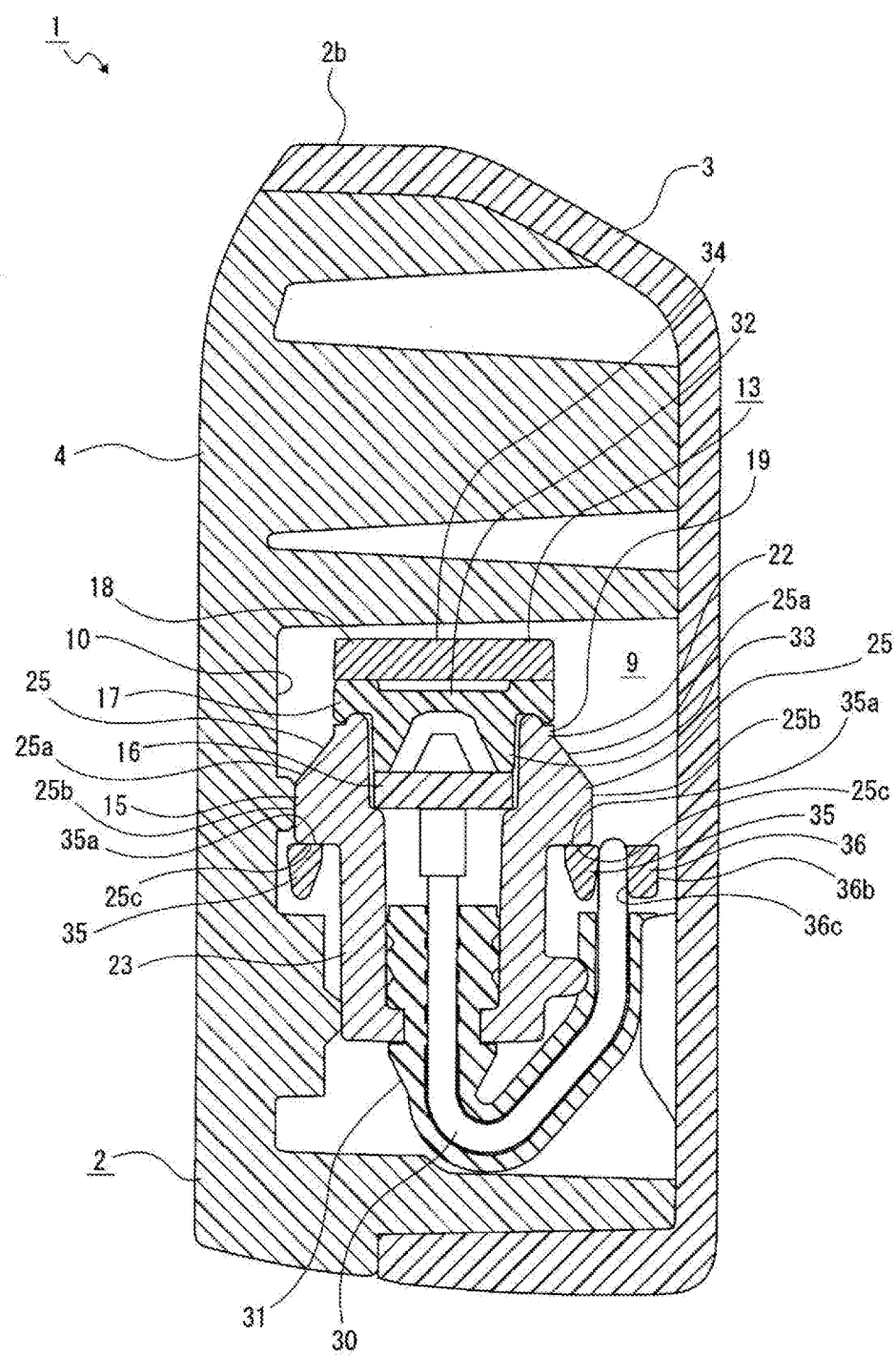
FIG. 7 is an enlarged sectional view taken along a line VII-VII in FIG. 3.

As to the connecting projecting portions 25, 25, . . . , two connecting projecting portions are provided on each of the left and right side surfaces of the circuit board disposing portion 22 so as to be spaced apart from each other in the front-to-rear direction (refer to FIGS. 6, 7 and 9). The connecting projecting portions 25 each have a guiding surface 25a which is inclined so as to move away from the left and right side surfaces of the circuit board disposing portion 22 as it extends downwards, a sliding surface 25b which connects to a lower end of the guiding surface 25a and which is oriented in the left-to-right direction, and a connecting and locking surface 25c which connects to the sliding surface 25b and which is oriented downwards.

The first light guiding lens 20 is provided so as to projects downwards from a front end side portion of the circuit board disposing portion 22 (refer to FIGS. 4, 5 and 9). The first light guiding lens 20 is positioned so as to be spaced apart from the cord inserting portion 23 on a front side of the cord inserting portion 23.

The first light guiding lens 20 has a pillar-like shape which extends in the up-to-down direction and has a first light entering surface 20a which is oriented upwards at an upper end and a first light exiting surface 20b at a lower end thereof. The first light exiting surface 20b is formed into an inclined surface which is displaced downwards as it moves away from an external surface of the door panel 101 in the left-to-right direction and is inclined inwards in the left-to-right direction of the vehicle with respect to a plane which is at right angles to a vertically extending axis P of light emitted from a light emitting element, which will be described later (refer to FIG. 6).

The first light guiding lens 20 has a shape in which an external shape thereof becomes larger as the first light guiding lens 20 extends away from the first light entering surface 20a towards the first light exiting surface 20b.

A positioning projecting portion 20d is provided on the first light guiding lens 20 in a position lying closer to a lower end thereof so as to project sideways.

The second light guiding lens 21 is positioned on a front side of the first light guiding lens 20 (refer to FIGS. 4, 5 and 9). The second light guiding lens 21 is provided so as to connect to an upper end portion of the first light guiding lens 20 at a lower end portion thereof, to connect to the circuit board disposing portion 22 at a rear end portion thereof and to project to the front while projecting obliquely upwards from the first light guiding lens 20.

The second light guiding lens 21 has a second light entering surface 21a on an upper surface side of a lower end portion thereof and a functional surface 21b which is oriented substantially to the front at an upper end portion thereof. The second light entering surface 21a is inclined with respect to the axis P of light emitted from the light emitting element and is formed so as to project towards the light emitting element. The functional surface 21*b* also functions as a second light exiting surface.

A first reflecting surface 21*c* which is oriented downwards is formed at the lower end portion of the second light guiding lens 21, and a second reflecting surface 21*d* which is oriented to the front while being oriented obliquely downwards is formed between the first reflecting surface 21*c* and the functional surface 21*b*. A third reflecting surface 21*e* is formed on the second light guiding lens 21 so as to connect to the functional surface 21*b*. This third reflecting surface 21*e* is oriented to the rear while being oriented obliquely upwards. The third reflecting surface 21*e* is positioned above the first reflecting surface 21*c*. Light can be reflected internally in any of the first reflecting surface 21*c*, the second reflecting surface 21*d* and the third reflecting surface 21*e*.

The composite structure 15 configured in the way described above is positioned relative to the housing 2 with the positioning pin 7 of the inner panel 5 inserted in the positioning hole 24*a* formed in the positioning projecting portion 24 of the housing 19 and the positioning projecting portion 20*d* of the first light guiding lens 20 inserted in the positioning recess portion 4*c* formed on the second panel 4 and is disposed in the first space 10 of the disposing space 9, as shown in FIGS. 4 and 6.

In such a state that the composite structure 15 is positioned and is disposed in the first space 10 of the disposing space 9 in the way described above, the lower end portion of the first light guiding lens 20 is positioned while being fitted in an inside of an upper end portion of the restricting wall portion 8 of the housing 2.

The circuit board 16 has a plate shape which is oriented in the up-to-down direction and is made into a double-face circuit board (refer to FIGS. 4, 5, 6, 7 and 9). A diode 26 having a rectifying function and resistors 27, 27 having a current limiting function are mounted on a front half portion of an upper surface 16*a* of the circuit board 16. A light emitting element 28 which functions as a light source which emits light is mounted on a front side of a front half portion on a lower surface 16*b* of the circuit board 16 and a capacitor 29 having a battery function and a discharge function is mounted on a rear side of the front half portion.

For example, a light emitting diode (LED) is used as the light emitting element 28 and is disposed in such a state that a light emitting surface 28*a* is oriented downwards. Consequently, as has been described above, the axis P of light emitted from the light emitting element 28 extends in the up-to-down direction.

The first light exiting surface 20*b* of the first light guiding lens 20 is positioned below the light emitting element 28, the functional surface 21*b* of the second light guiding lens 21 is positioned above the light emitting element 28, and the first light emitting surface 20*b* and the functional surface 21*b* are disposed on opposite sides with a horizontal plane S interposed therebetween. The horizontal plane S includes a light emitting surface 28*a* of the light emitting element 28 and intersects the optical axis P of the light emitting element 28 at right angles.

Respective end portions of connection cords 30, 30 are connected to a rear half portion of the circuit board 16 from therebelow through soldering, and a driving current is supplied to the light emitting element 28 by these connection cords 30, 30. The connection cords 30, 30 are inserted through the first space 10 of the disposing space 9 and are then inserted through an interior of the door 100 via a front end portion of the housing 2 to thereby be connected to a power supply circuit, not shown at the other end portions thereof.

Bushings 31 are fitted on one end side portions of the connection cords 30, 30, and the connection cords 30, 30 are protected by the bushings 31 (refer to FIGS. 4, 5, 7 and 9). The bushings 31 are formed from a rubber material and can be deformed elastically.

The circuit board 16 is inserted into the circuit board disposing portion 22 of the housing 19 from thereabove with the connection cords 30, 30 connected thereto and is disposed in the interior of the circuit board disposing portion 22 (refer to FIGS. 4, 5, 6 and 7). By being inserted into the circuit board disposing portion 22, the circuit board 16 is positioned with respect to the housing 19 in relation to the horizontal direction and is positioned with respect to the housing 19 in the up-to-down direction (the vertical direction) by an outer circumferential portion of a lower surface 16*b* being brought into contact with and borne by circuit board bearing surfaces 22*a*, 22*a*, . . . of the circuit board disposing portion 22.

As this occurs, the connection cords 30, 30 and the bushings 31 which protect the connection cords 30, 30 are inserted through the cord inserting portion 23 from thereabove, whereby the connection cords 30, 30 and the bushings 31 are attached to the housing 19 (refer to FIGS. 4, 5 and 7).

The connection cords 30, 30 and the bushings 31 are bent back upwards at a substantially central portion in their longitudinal direction (refer to FIG. 7).

In such a state that the circuit board 16 is disposed in the circuit board disposing portion 22 in the way described above, the gasket 17 is mounted on the circuit board disposing portion 22 (refer to FIGS. 4, 5, 6, 7 and 9). The gasket 17 is made up of a substantially flat plate-like closing surface portion 32 which is oriented in the up-to-down direction and an annular fastening portion 33 which projects downwards from a portion lying slightly further radially inwards than an outer circumferential surface of the closing surface portion 32 which are formed integrally.

An external shape of the closing surface portion 32 is the same as an external shape of the circuit board disposing portion 22 and a size of the closing surface portion 32 is substantially the same as an external size of the circuit board disposing portion 22. An annular fastened projecting portion 32*a* which projects upwards is provided on an upper surface of the closing surface portion 32 at a portion which lies closer to an outer circumference thereof. An annular fitting recess portion 32*b* which is opened downwards is provided on a lower surface of the closing surface portion 32 at a portion which lies closer to an outer circumference thereof. The fitting recess portion 32*b* is positioned directly below the fastened projecting portion 32*a*. An annular engaging projecting portion 32*c* which projects downwards is provided on an outer circumferential portion of the lower surface of the closing surface portion 32 so as to connect to an outer side of the fitting recess portion 32*b*. An air vent hole 32*d* is formed in the closing surface portion 32 so as to penetrate therethrough in the up-to-down direction.

An external shape of the fastening portion 33 is the same as an internal shape of the circuit board disposing portion 22 and a size of the fastening portion 33 is substantially the same as an internal size of the circuit board disposing portion 22.

The gasket 17 is mounted on the housing 19 in such a state that the fastening portion 33 is inserted into the interior of the circuit board disposing portion 22 and the closing surface portion 32 closes an opening of the circuit board disposing portion 22 (refer to FIGS. 4, 5, 6 and 7), whereby the circuit board 16 which is disposed in the circuit board disposing portion 22 by the gasket 17 is waterproofed.

As this occurs, an outer circumferential surface of the fastening portion 33 is positioned so as to be in close contact with or to stay close to an inner circumferential surface of the circuit board disposing portion 22, and a distal end portion of the fastening portion 33 is pressed against an outer circumferential portion of the circuit board 16 from thereabove. By the distal end portion of the fastening portion 33 being pressed against the circuit board 16, a lower surface of the outer circumferential portion of the circuit board 16 is pressed against the circuit board bearing surfaces 22a, 22a, . . . of the circuit board disposing portion 22.

The circuit board 16 is waterproofed by mounting the gasket 17 on the housing 19 in the way described above, and thereby the circuit board 16 is waterproofed and is fastened relative to the housing 19 by the fastening portion 33 of the gasket 17.

Consequently, it is possible to obviate the necessity of performing the sealing operation to waterproof the circuit board 16 and the holding operation of attaching and screwing down the fastening spring for holding the circuit board 16 to the housing 19 and the enhancement in the workability and the decrease of the fabrication cost can be performed, whereby the circuit board 16 can be held stably to the housing 19 and the circuit board 16 can be waterproofed well.

With the gasket 17 mounted on the housing 19, the fitting projecting portion 22b of the circuit board disposing portion 22 is inserted into the fitting recess portion 32b on the gasket 17 to be fitted therein, and the engaging projecting portion 32c on the gasket 17 is inserted into the engaging recess portion 22c on the circuit board disposing portion 22 for engagement therewith.

In such a state that the gasket 17 is mounted on the housing 19 in the way described above, the engaging projecting portion 32c, which is provided in a position outside the fastening portion 33 so as to project in the same direction as the fastening portion 33, is inserted into the engaging recess portion 22c. Consequently, the gasket 17 is made difficult to collapse inwards relative to the circuit board disposing portion 22, whereby not only can the gasket 17 be mounted on the housing 19 stably in an ensured fashion, but also the circuit board 16 can be fastened stably by the fastening portion 33 of the gasket 17.

In such a state that the gasket 17 is mounted on the circuit board disposing portion 22 in the way described above, the lid member 18 is connected to the housing 19. The lid member 18 has a substantially flat plate-shaped covering surface portion 34 which is oriented in the up-to-down direction, side surface portions 35, 35 which project downwards from left and right side portions of the covering surface portion 34 and a cord fastening portion 36 which is provided continuously to a lower end portion of one side surface portion 35 of the side surface portions 35, 35 (refer to FIGS. 4, 5, 6, 7 and 9).

An external shape of the covering surface portion 34 is the same as an external shape of the closing surface portion 32 of the gasket 17 and a size of the covering surface portion 34 is slightly larger than the external shape of the closing surface portion 32.

Connecting holes 35a, 35a, . . . are formed in the side surface portions 35, 35 so as to penetrate therethrough horizontally laterally. As to the connecting holes 35a, 35a, . . . , two connecting holes are formed on each of the side surface portions 35, 35 so as to be spaced apart from each other in the front-to-rear direction.

The cord fastening portion 36 is made up of a connecting portion 36a which projects sideways (outwards) from the side surface portion 35 and a fastening piece portion 36b which connects to a distal end portion of the connecting portion 36a while extending in the front-to-rear direction. The fastening piece portion 36b connects to the connecting portion 36a at a central portion in a longitudinal direction, and cord fastening holes 36c, 36c are formed between the fastening piece portion 36b and the side surface portion 35 so as to extend in the front-to-rear direction while being spaced apart from each other in the front-to-rear direction. The cord fastening holes 36c, 36c penetrate the cord fastening portion 36 in the up-to-down direction.

The lid member 18 is connected to the housing 19 in such a state that the side surface portions 35, 35 fit on the circuit board disposing portion 22 (refer to FIGS. 4 and 7). The lid member 18 is connected to the housing 19 as follows.

Firstly, the lid member 18 is moved downwards towards the housing 19 from an upper side, and the side surface portions 35, 35 are guided along the guiding surfaces 25a, 25a, . . . of the connecting projecting portions 25, 25, . . . and are elastically deformed so as to expand outwards. Next, inner surfaces of lower end portions of the side surface portions 35, 35 slide on the sliding surfaces 25b, 25b, . . . , and following this, the connecting projecting portions 25, 25, . . . are inserted individually into the corresponding connecting holes 35a, 35a, . . . when lower opening edges of the connecting holes 35a, 35a, . . . coincide with lower ends of the sliding surfaces 25b, 25b, . . . , whereby the side surface portions 35, 35, . . . are elastically restored (refer to FIGS. 6 and 7). When the side surface portions 35, 35 are elastically restored, the lower opening edges of the connecting holes 35a, 35a, . . . are locked on the connecting and locking surfaces 25c, 25c, . . . , whereby the lid member 18 is connected to the housing 19.

In such a state that the lid member 18 is connected to the housing 19, the fastened projecting portion 32a which is provided on the closing surface portion 32 of the gasket 17 is fastened downwards by a portion of the covering surface portion 34 which lies close to an outer circumference thereof to thereby be collapsed. Consequently, a downward pressing force is exerted on the gasket 17 from the lid member 18, whereby the fastening portion 33 is pressed against the outer circumferential portion of the circuit board 16 to thereby be brought into close contact therewith. This presses the fitting projecting portion 22b of the circuit board disposing portion 22 against the fitting recess portion 32b of the gasket 17 further to thereby be brought into close contact therewith, whereby the engaging projecting portion 32c of the gasket 17 is pressed against the engaging recess portion 22c of the circuit board disposing portion 22 to be brought into close contact therewith.

Since the lid member 18 which is connected to the housing 19 to fasten the gasket 17 is provided on the composite structure 15, no separate exclusive device for fixing the gasket 17 to the housing 19 is necessary, and it is possible not only to realize a reduction in the number of constituent components and a reduction in the number of working man-hours but also to mount the gasket 17 on the housing 19 stably.

In addition, since the direction in which the gasket 17 is mounted on the housing 19 and the direction in which the lid member 18 is connected to the housing 19 are the same, it is possible not only to mount the gasket 17 on the housing 19 more stably but also to fasten the circuit board 16 with the gasket 17 more stably.

Further, the fitting recess portion 32b in which the fitting projecting portion 22b fits is formed directly below the fastened projecting portion 32a of the gasket 17, it is made difficult for the gasket 17 to collapse relative to the circuit board disposing portion 22, whereby it is possible not only to mount the gasket 17 on the housing 19 more stably but also to fasten the circuit board 16 with the gasket 17 more stably.

In such a state that the lid member 18 is connected to the housing 19, a space is defined between the covering surface portion 34 of the lid member 18 and the closing surface portion 32 of the gasket 17 (refer to FIG. 5). As this occurs, the space so defined and the space below the closing surface portion 32 where the circuit board 16 is disposed are allowed to communicate with each other by the air vent hole 32d formed in the closing surface portion 32. Consequently, a difference in pressure and a difference in temperature are made difficult to be generated between the upper space and the lower space and an unnecessary load is made difficult to be exerted on the gasket 17, the lid member 18 and the circuit board disposing portion 22. Therefore, neither deformation nor distortion is generated in these constituent components, whereby these constituent components can be disposed and connected together in a stable fashion.

In addition, in such a state that the lid member 18 is connected to the housing 19, portions of the connection cords 30, 30 are sequentially inserted into the cord fastening holes 36c, 36c which are defined between the fastening piece portion 36b of the housing 19 and the circuit board disposing portion 22 to thereby be fastened by the cord fastening portion 36 (refer to FIG. 7).

Figure 3:
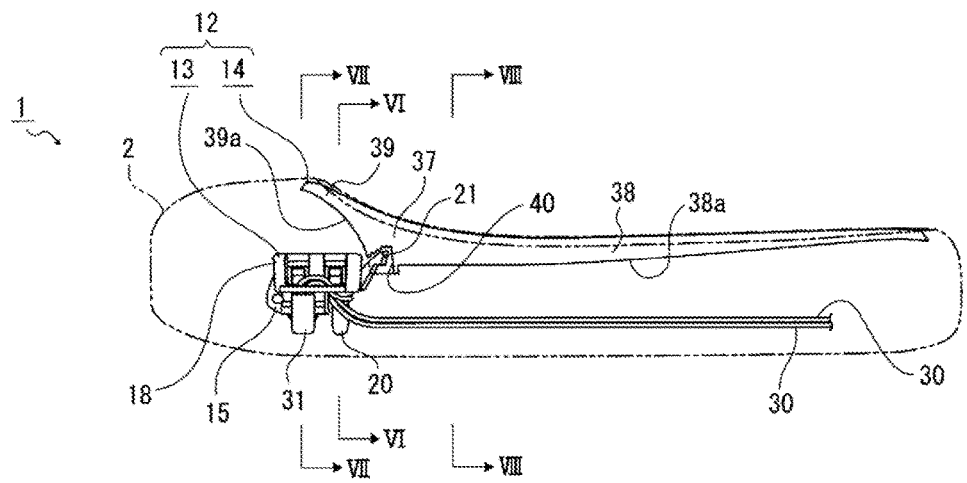
FIG. 3 is a schematic side view of the vehicle lamp.

The light guiding member 14 has the shape which extends substantially in the front-to-rear direction as a whole, and the portion excluding the rear end portion is disposed on the front side of the illumination member 13, and the rear end portion is disposed above the illumination member 13 (refer to FIGS. 2 and 3).

The light guiding member 14 is formed of the transparent material. A portion lying close to a rear end of the light guiding member 14 is provided as a broad portion 37 having a largest vertical width. A portion lying further forwards than the broad portion 37 is provided as an extending portion 38 which extends substantially in the front-to-rear direction. A portion lying further rearwards than the broad portion 37 is provided an inclined portion 39 which extends obliquely upwards while extending to the rear from the broad portion 37.

A cutout portion 40 is formed at a lower end portion of the broad portion 37 so as to be opened towards the rear and substantially downwards (refer to FIG. 4). A front surface which is formed by the cutout 40 is formed as a first light entering surface 40a, and a lower surface formed by the cutout 40 is formed as a second light entering surface 40b. The second light entering surface 40b has a step-like shape.

The extending portion 38 is formed so as to be tapered as it extends to the front, and a lower surface of the extending portion 38 is formed as an embossed internal reflecting surface 38a (refer to FIGS. 3 and 8). Aligning elongated projections 38b, 38b are provided at a middle portion of the extending portion 38 in relation to the up-to-down direction so as to project sideways. A portion of the extending portion 38 which lies upper than the aligning elongated projections 38b, 38b is formed substantially into a wedge shape whose lateral width decreases as it extends upwards (refer to FIGS. 8 and 9).

The inclined portion 39 is formed so as to be tapered as it extends to the rear and a rear surface (a surface oriented obliquely downwards) is formed an embossed internal reflecting surface 39a (refer to FIGS. 3 and 6). Aligning elongated projections 39b, 39b are provided at a lower end portion of the inclined portion 39 so as to project sideways (refer to FIGS. 6 and 9). The inclined portion 39 is formed so that its lateral width becomes smallest at an upper end portion thereof.

An upper end portion of the light guiding member 14 is also embossed, and an upper surface is formed as a light exiting surface 14a.

The light guiding member 14 has a cover portion 41 which is provided at a lower end portion of the broad portion 37 (refer to FIG. 9). The cover portion 41 is provided so as to be oriented in the left-to-right direction on a side of the first light entering surface 40a and the second light entering surface 40b.

The light guiding member 14 is aligned with the housing 2 (refer to FIGS. 4, 6 and 8) with the aligning elongated projections 38b, 38b and the aligning elongated projections 39b, 39b inserted into the aligning recess portion 3a formed on the first panel 3 and the aligning recess portion 4a formed in the second panel 4, respectively, and is disposed in the first space 10 of the disposing space 9.

In such a state that the light guiding member 14 is disposed in the first space 10 of the disposing space 9 in the way described above, a distal end portion of the second light guiding lens 21 of the illumination member 13 is positioned in the cutout 40 of the light guiding member 14 (refer to FIG. 4). In the light guiding member 14, the first light entering surface 40a is positioned so as to face the functional surface 21b of the second light guiding lens 21 and the second light entering surface 40b is positioned so as to face the third reflecting surface 21e of the second light guiding lens 21.

In addition, in such a state that the light guiding member 14 is disposed in the first space 10, the light exiting surface 14a is positioned slightly further downwards than the upper surface 2b of the housing 2 (refer to FIGS. 6 and 8).

Further, in such a state that the light guiding member 14 is disposed in the first space 10, a distal end portion of the second light guiding lens 21 of the composite structure 15 is covered from the side by the cover portion 41.

As has been described, since the composite structure 15 is made up of the housing 19, the first light guiding lens 20 and the second light guiding lens 21 which are formed integrally, the housing 19 which is the portion having the function to hold the circuit board 16 and the first light guiding lens 20 and the second light guiding lens 21 which have the function to guide light are formed integrally, thereby making it possible to enhance the functionality while realizing a reduction in the number of constituent components.

In addition, since light emitted from the light emitting element 28 is guided in the predetermined direction by the first light guiding lens 20 and the second light guiding lens 21 which are formed integrally with the housing 19, it is possible to ensure the high functionality in relation to shining light without calling for an increase in fabrication cost.

Hereinafter, light emission from the illumination member 13 and the light guiding member 14 will be described (refer to FIGS. 10 and 11).

Figure 10:
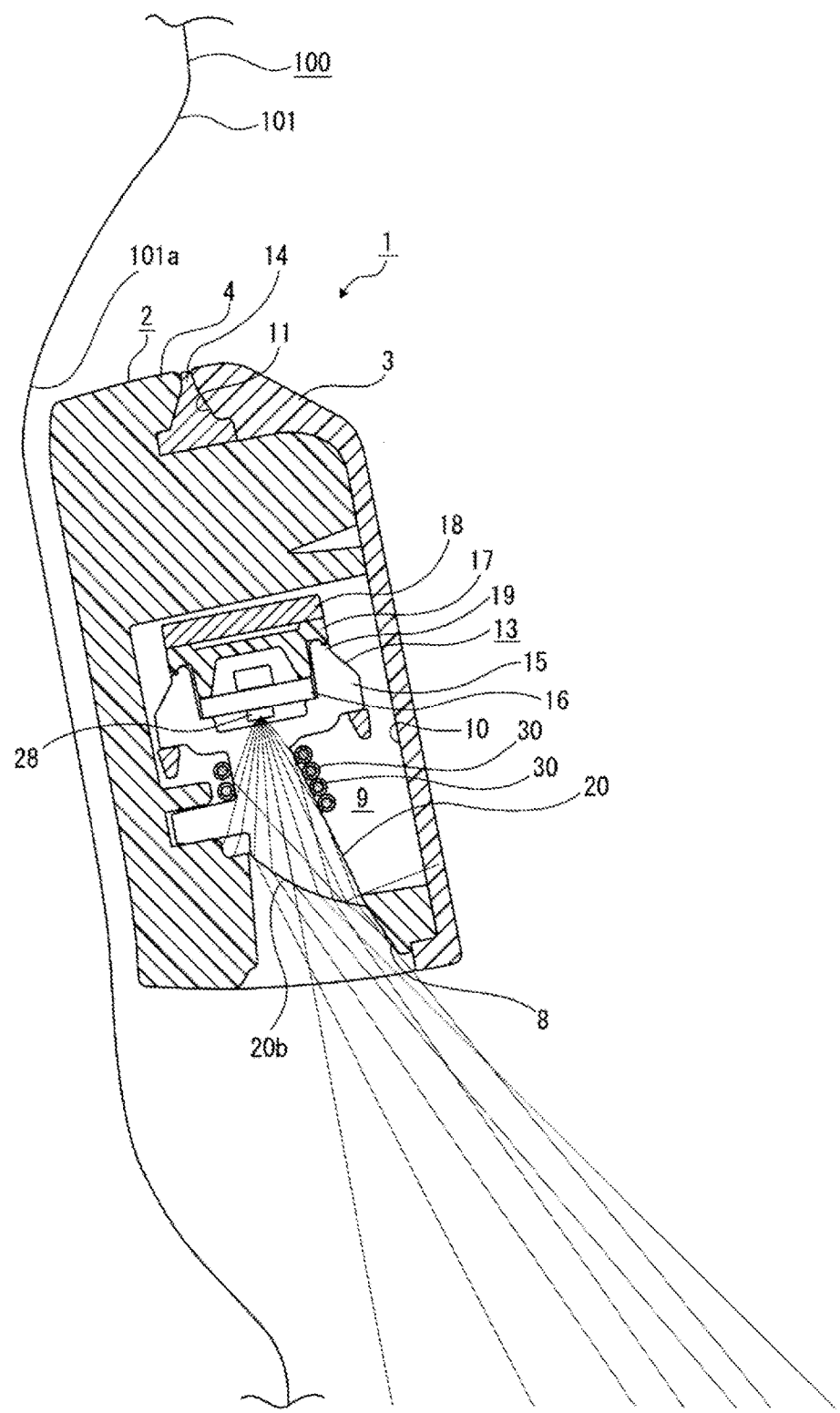
FIG. 10 is an enlarged view showing optical paths of light emitted from a first light guiding lens.

When light is emitted from the light emitting surface 28a of the light emitting element 28 mounted on the circuit board 16, as shown in FIG. 10, the light emitted downwards enters the interior of the first light guiding lens 20 from the first light entering surface 20a, and part of the light is internally reflected on a circumferential surface of the first light guiding lens 20 and is guided towards the first light exiting surface 20b by the first light guiding lens 20.

As has been described above, the first light guiding lens 20 is formed so that the external shape becomes larger as it extends from the first light entering surface 20a towards the first light exiting surface 20b. Consequently, light which is internally reflected on the circumferential surface of the first light guiding lens 20 is prevented from being diffused while being guided as light which is close to parallel light, thereby making it possible to shine the light from the first light exiting surface 20b to an area required to be illuminated.

The light guided by the first light guiding lens 20 is emitted downwards from the first light existing surface 20b. Although the light emitted from the first light exiting surface 20b is refracted by the first light existing surface 20b, since the first light exiting surface 20b is formed into the inclined surface which is displaced downwards as the first light existing surface 20b moves away from the vehicle in the left-to-right direction and is inclined relative to the optical axis P, the light emitted from the first light exiting surface 20b is refracted in a direction in which the light moves away from the door panel 101 of the vehicle and is then shone downwards at the side of the door panel 101.

Since the first light guiding lens 20 is such that the first light exiting surface 20b is inclined relative to the optical axis P, the light emitted from the first light exiting surface 20b can be refracted to be shone in a desired direction by adjusting the inclined angle of the first light exiting surface 20b to an angle which satisfies a requirement.

Figure 11:
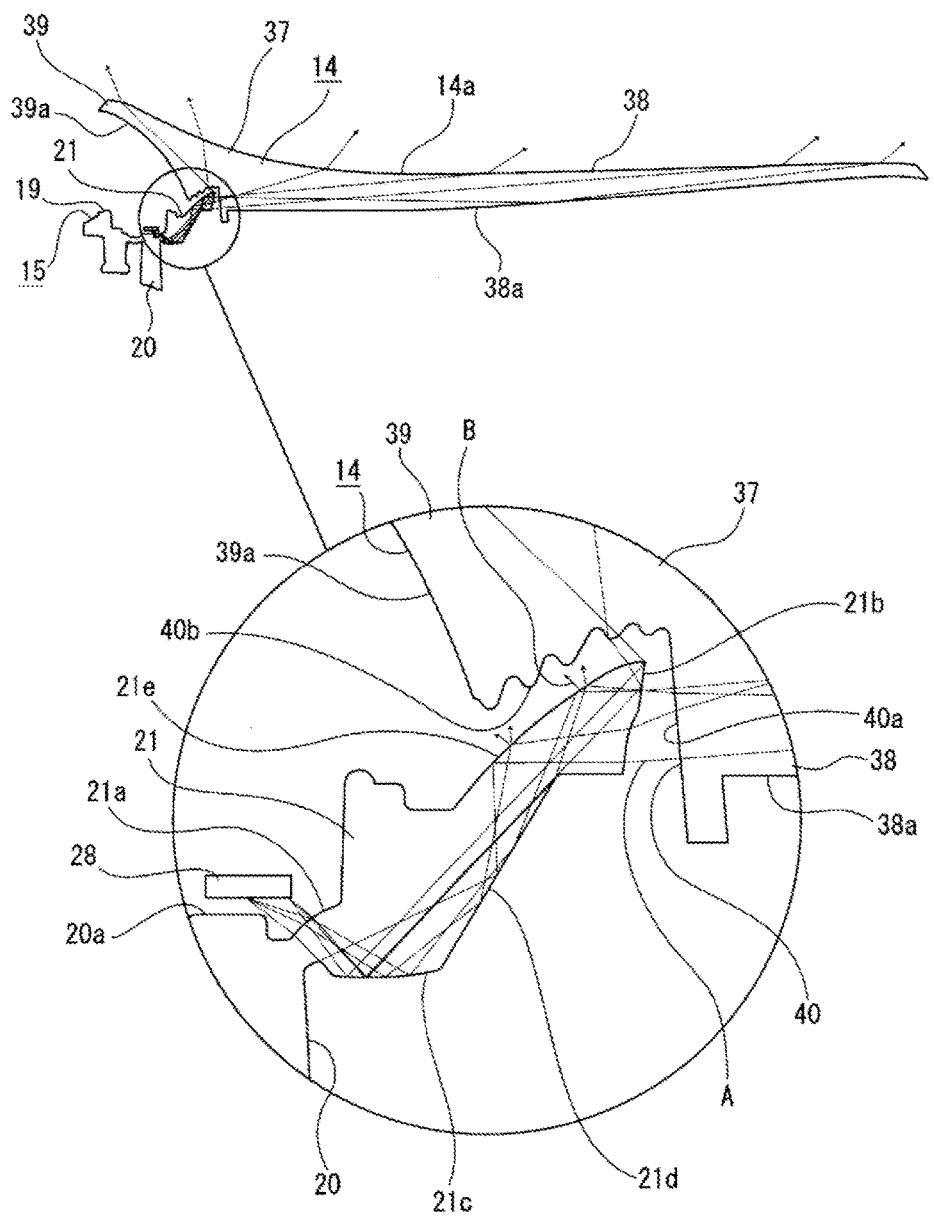
FIG. 11 is a view showing optical paths of light emitted from a light guiding member via a second light guiding lens.

On the other hand, when light is emitted from the light emitting surface 28a of the light emitting element 28 mounted on the circuit board 16, the light emitted in an oblique direction also enters the interior of the second light guiding lens 21 from the second light entering surface 21a, and the light that has entered travels towards the first reflecting surface 21c (refer to FIG. 11). Light A and light B which are directed towards the first reflecting surface 21c are internally reflected on the first reflecting surface 21c to be directed towards the second reflecting surface 21d or the functional surface 21b.

The light A directed towards the second reflecting surface 21d is internally reflected on the second reflecting surface 21d to enter the third reflecting surface 21e. The light A that has entered the third reflecting surface 21e is directed to the functional surface 21b except for part thereof and is then emitted from the functional surface 21b to enter an interior of the light guiding member 14 from the first light entering surface 40a. The part of the light A which is internally reflected on the second reflecting surface 21d to enter the third reflecting surface 21e leaks from the third reflecting surface 21e to be emitted therefrom and then enters the interior of the light guiding member 14 from the second light entering surface 40b.

The light B which is internally reflected on the first reflecting surface 21c to be directed to the functional surface 21b is internally reflected on the functional surface 21b to enter the third reflecting surface 21e. The light B that has entered the third reflecting surface 21e is emitted from the third reflecting surface 21e to enter the interior of the light guiding member 14 from the second light entering surface 40b.

The light that has entered the interior of the light guiding member 14 from the first light entering surface 40a is guided through an interior of the extending portion 38 and is then emitted from the light exiting surface 14a. The light that has entered the interior of the light guiding member 14 from the second light entering surface 40b is guided through an interior of the broad portion 37 or the inclined portion 39 and is then emitted from then light exiting surface 14a.

Some of the light which is guided through the interior of the light guiding member 14 reaches the internal reflecting surface 39a or the internal reflecting surface 38a, and this light is internally reflected on the internal reflecting surface 39a or the internal reflecting surface 38a and is then guided to the light exiting surface 14a. The upper end portion of the light guiding member 14 is also embossed, and some of the light that has entered the interior of the light guiding member 14 is also internally reflected by the embossed portion and is then guided to the light exiting surface 14a.

The light that has entered the light guiding member 14 is guided through the interior of the broad portion 37, the inclined portion 39 or the extending portion 38 to be emitted from the light exiting surface 14a in the way described above, and therefore, the whole of the light emitting surface 14a is visualized as being bright or shining.

As has been described above, in the vehicle lamp 1, the light that enters from the first light entering surface 20a and the light that enters from the second light entering surface 21a are emitted in the different directions in the composite structure 15. Thus, the light emitted from the single light emitting element 28 is emitted in the different directions, thereby making it possible to enhance the functionality in relation to light control without increasing the number of constituent components.

The light emitted from the second light entering surface 21a is emitted from the functional surface 21b or is reflected on the functional surface 21b depending on the light guiding paths in the interior of the second light guiding lens 21. Thus, the light is emitted in the different directions depending on the light guiding paths in the interior of the second light guiding lens 21, thereby making it possible to enhance the functionality in relation to light control further.

The first light exiting surface 20b and the functional surface 21b are positioned on the opposite sides with the horizontal plane S held therebetween which includes the light emitting surface 28a of the light emitting element 28 and intersects the optical axis P of the light emitting element 28 at right angles. Thus, the first light exiting surface 20b and the functional surface 21b which emit light are positioned on the opposite sides to the horizontal plane S which includes the light emitting element 28, thereby making it possible to enhance the functionality in relation to light control further.

The second light entering surface 21a of the second light guiding lens 21 is inclined relative to the axis P of the light emitted from the light emitting element 28, that is, the optical axis P of the light emitting element 28 and is formed so as to project towards the light emitting element 28. Thus, the light that enters from the second light entering surface 21a is refracted in a direction in which the light is collected, whereby a little of the light which is emitted in the oblique direction from the light emitting element 28 is collected to realize an effective use of the light emitted from the light emitting element 28.

DESCRIPTION OF REFERENCE NUMERALS 1 vehicle lamp; 16 circuit board; 19 housing; 20 first light guiding lens; 20a first light entering surface; 20b first light exiting surface; 21 second light guiding lens; 21a second light entering surface; 21*b* functional surface; 21*c* first reflecting surface; 21*d* second reflecting surface; 21*e* third reflecting surface; 28 light emitting element.

While the invention has been described with respect to a limited number of embodiments, those skilled in the art, having benefit of this disclosure, will appreciate that other embodiments can be devised which do not depart from the scope of the invention as disclosed herein. Additionally, various alterations and modifications can be made to the disclosed embodiments without departing from the spirit and scope of the invention. Accordingly, the scope of the invention should be limited only by the attached claims.

The invention claimed is:

1. A vehicle lamp comprising:
a circuit board on which a light emitting element is mounted;
a housing for holding the circuit board;
a first light guiding lens for guiding part of light emitted from the light emitting element in a predetermined direction, and
a second light guiding lens for guiding at least the other part of the light emitted from the light emitting element in the other predetermined direction,
wherein the housing, the first light guiding lens and the second light guiding lens are formed integrally,
wherein the housing comprises a circuit board disposing portion formed into a box shape that is opened upwards, and
wherein the second light guiding lens is provided so as to connect to an upper end portion of the first light guiding lens at a lower end portion thereof, to connect to the circuit board disposing portion at a rear end portion thereof and to project to the front while projecting obliquely upwards from the first light guiding lens.

2. The vehicle lamp according to claim 1,
wherein a first light entering surface which part of light emitted from the light emitting element enters is formed on the first light guiding lens,
wherein a second light entering surface which at least the other part of the light emitted from the light emitting element enters and a reflecting surface which reflects light which enters from the second light entering surface are formed on the second light guiding lens, and
wherein the light which enters from the first light entering surface and the light which enters from the second light entering surface are emitted in different directions.

3. The vehicle lamp according to claim 2,
wherein a functional surface is formed on the second light guiding lens, and
wherein part of light which enters from the second light entering surface is reflected at the reflecting surface and light which enters from the second light entering surface is emitted from the functional surface or is reflected on the functional surface depending on a light guiding path in the second light guiding lens.

4. The vehicle lamp according to claim 3,
wherein the first light entering surface intersects an axis of light emitted from the light emitting element at right angles, and
wherein the second light entering surface is inclined relative to the axis of the light emitted from the light emitting element and is formed so as to project towards the light emitting element.

5. The vehicle lamp according to claim 4,
wherein a functional surface from which part of light emitted from the light emitting element is emitted is formed on the second light guiding lens,
wherein a first light exiting surface which emits light which enters from the first light entering surface are formed on the first light guiding lens, and
wherein the first light exiting surface and the functional surface are positioned on opposite sides with a plane held therebetween which includes a light emitting surface of the light emitting element and intersects an optical axis of the light emitting element at right angles.

6. The vehicle lamp according to claim 5,
wherein a first light entering surface which part of light emitted from the light emitting element enters and a first light exiting surface which emits light which enters from the first light entering surface are formed on the first light guiding lens, and
wherein the first guiding lens has a shape in which an external shape becomes larger as the first guiding lens extends from the first light entering surface towards the first light exiting surface.

7. The vehicle lamp according to claim 4,
wherein a first light entering surface which part of light emitted from the light emitting element enters and a first light exiting surface which emits light which enters from the first light entering surface are formed on the first light guiding lens, and
wherein the first guiding lens has a shape in which an external shape becomes larger as the first guiding lens extends from the first light entering surface towards the first light exiting surface.

8. The vehicle lamp according to claim 3,
wherein a functional surface from which part of light emitted from the light emitting element is emitted is formed on the second light guiding lens,
wherein a first light exiting surface which emits light which enters from the first light entering surface are formed on the first light guiding lens, and
wherein the first light exiting surface and the functional surface are positioned on opposite sides with a plane held therebetween which includes a light emitting surface of the light emitting element and intersects an optical axis of the light emitting element at right angles.

9. The vehicle lamp according to claim 8,
wherein a first light entering surface which part of light emitted from the light emitting element enters and a first light exiting surface which emits light which enters from the first light entering surface are formed on the first light guiding lens, and
wherein the first guiding lens has a shape in which an external shape becomes larger as the first guiding lens extends from the first light entering surface towards the first light exiting surface.

10. The vehicle lamp according to claim 3,
wherein a first light entering surface which part of light emitted from the light emitting element enters and a first light exiting surface which emits light which enters from the first light entering surface are formed on the first light guiding lens, and
wherein the first guiding lens has a shape in which an external shape becomes larger as the first guiding lens extends from the first light entering surface towards the first light exiting surface.

11. The vehicle lamp according to claim 2,
wherein the first light entering surface intersects an axis of light emitted from the light emitting element at right angles, and wherein the second light entering surface is inclined relative to the axis of the light emitted from the light emitting element and is formed so as to project towards the light emitting element.

12. The vehicle lamp according to claim 11, wherein a functional surface from which part of light emitted from the light emitting element is emitted is formed on the second light guiding lens, wherein a first light exiting surface which emits light which enters from the first light entering surface are formed on the first light guiding lens, and wherein the first light exiting surface and the functional surface are positioned on opposite sides with a plane held therebetween which includes a light emitting surface of the light emitting element and intersects an optical axis of the light emitting element at right angles.

13. The vehicle lamp according to claim 12, wherein a first light entering surface which part of light emitted from the light emitting element enters and a first light exiting surface which emits light which enters from the first light entering surface are formed on the first light guiding lens, and wherein the first guiding lens has a shape in which an external shape becomes larger as the first guiding lens extends from the first light entering surface towards the first light exiting surface.

14. The vehicle lamp according to claim 11, wherein a first light entering surface which part of light emitted from the light emitting element enters and a first light exiting surface which emits light which enters from the first light entering surface are formed on the first light guiding lens, and wherein the first guiding lens has a shape in which an external shape becomes larger as the first guiding lens extends from the first light entering surface towards the first light exiting surface.

15. The vehicle lamp according to claim 2, wherein a functional surface from which part of light emitted from the light emitting element is emitted is formed on the second light guiding lens, wherein a first light exiting surface which emits light which enters from the first light entering surface are formed on the first light guiding lens, and wherein the first light exiting surface and the functional surface are positioned on opposite sides with a plane held therebetween which includes a light emitting surface of the light emitting element and intersects an optical axis of the light emitting element at right angles.

16. The vehicle lamp according to claim 15, wherein a first light entering surface which part of light emitted from the light emitting element enters and a first light exiting surface which emits light which enters from the first light entering surface are formed on the first light guiding lens, and wherein the first guiding lens has a shape in which an external shape becomes larger as the first guiding lens extends from the first light entering surface towards the first light exiting surface.

17. The vehicle lamp according to claim 2, wherein a first light entering surface which part of light emitted from the light emitting element enters and a first light exiting surface which emits light which enters from the first light entering surface are formed on the first light guiding lens, and wherein the first guiding lens has a shape in which an external shape becomes larger as the first guiding lens extends from the first light entering surface towards the first light exiting surface.

18. The vehicle lamp according to claim 1, wherein a first light entering surface which part of light emitted from the light emitting element enters and a first light exiting surface which emits light which enters from the first light entering surface are formed on the first light guiding lens, and wherein the first guiding lens has a shape in which an external shape becomes larger as the first guiding lens extends from the first light entering surface towards the first light exiting surface.

19. The vehicle lamp according to claim 18, wherein the first light exiting surface is inclined relative to a plane which intersects an axis of light emitted from the light emitting element.

* * * * *